United States Patent [19]

Henderson, Jr.

[11] Patent Number: 5,306,038
[45] Date of Patent: Apr. 26, 1994

[54] MODEL CAR SUSPENSION LIFT AND LOWERING APPARATUS

[76] Inventor: Ronald D. Henderson, Jr., 6485 Calvine Rd., Sacramento, Calif. 90822

[21] Appl. No.: 962,928

[22] Filed: Oct. 19, 1992

[51] Int. Cl.$^5$ ............................................... B60G 1/00
[52] U.S. Cl. ..................................... 280/688; 280/704
[58] Field of Search ............... 296/187, 204; 280/688, 280/724, 704, 690

[56] References Cited

U.S. PATENT DOCUMENTS 4,159,126 6/1979 Raleigh ................................. 280/688
4,944,524 7/1990 Achenbach ...................... 280/688 X
5,169,171 12/1992 Ban et al. ............................. 280/688

Primary Examiner—Joseph D. Pape
Attorney, Agent, or Firm—Leon Gilden

[57] ABSTRACT

A model car employs at each wheel a spring member mounted in surrounding relationship relative to a guide tube, with the guide tube mounted fixedly to a respective wheel axle at a lower end of the guide tube, with an upper end of the guide tube mounted to an upper control arm portion of the model car vehicle, wherein a drive motor includes a cable directed through the guide tube to effect adjustable displacement of the control arm relative to the axle at each wheel of the model car structure.

2 Claims, 4 Drawing Sheets

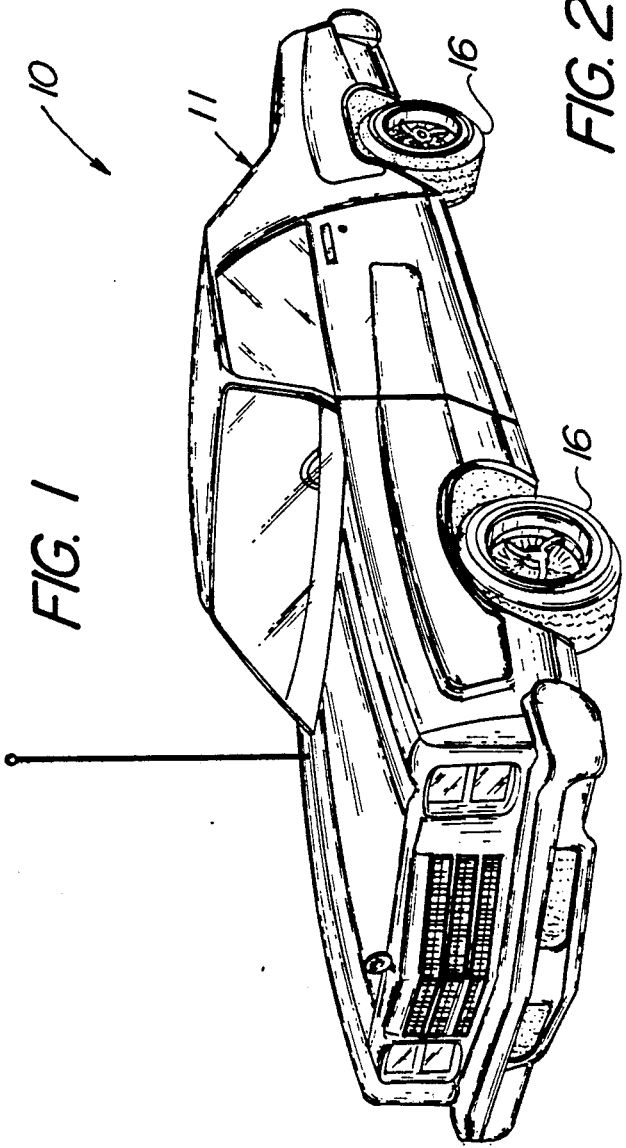
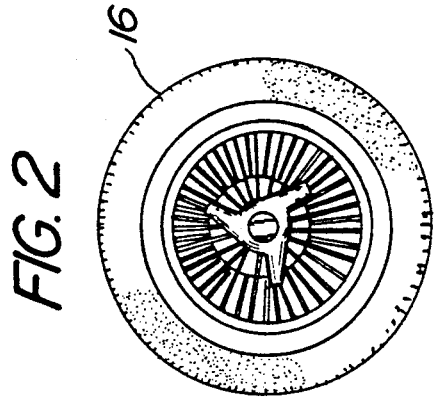
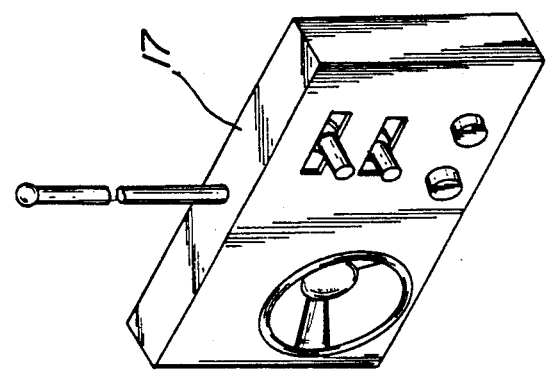

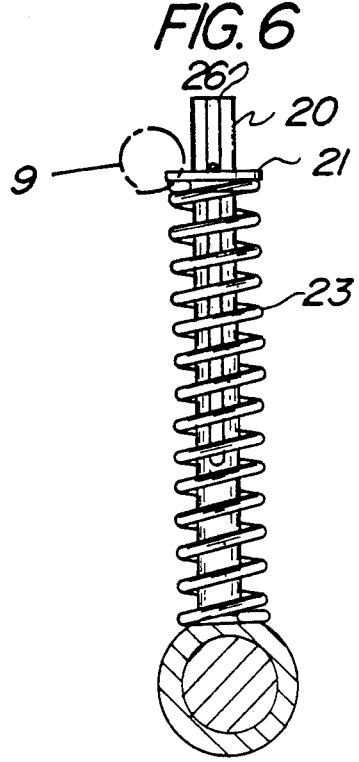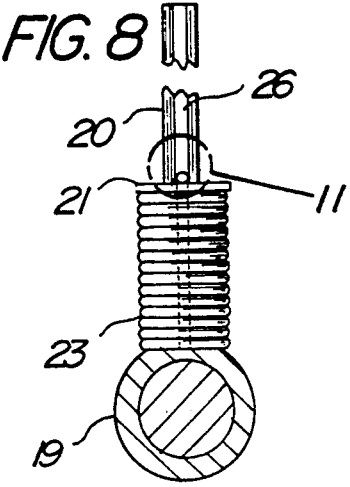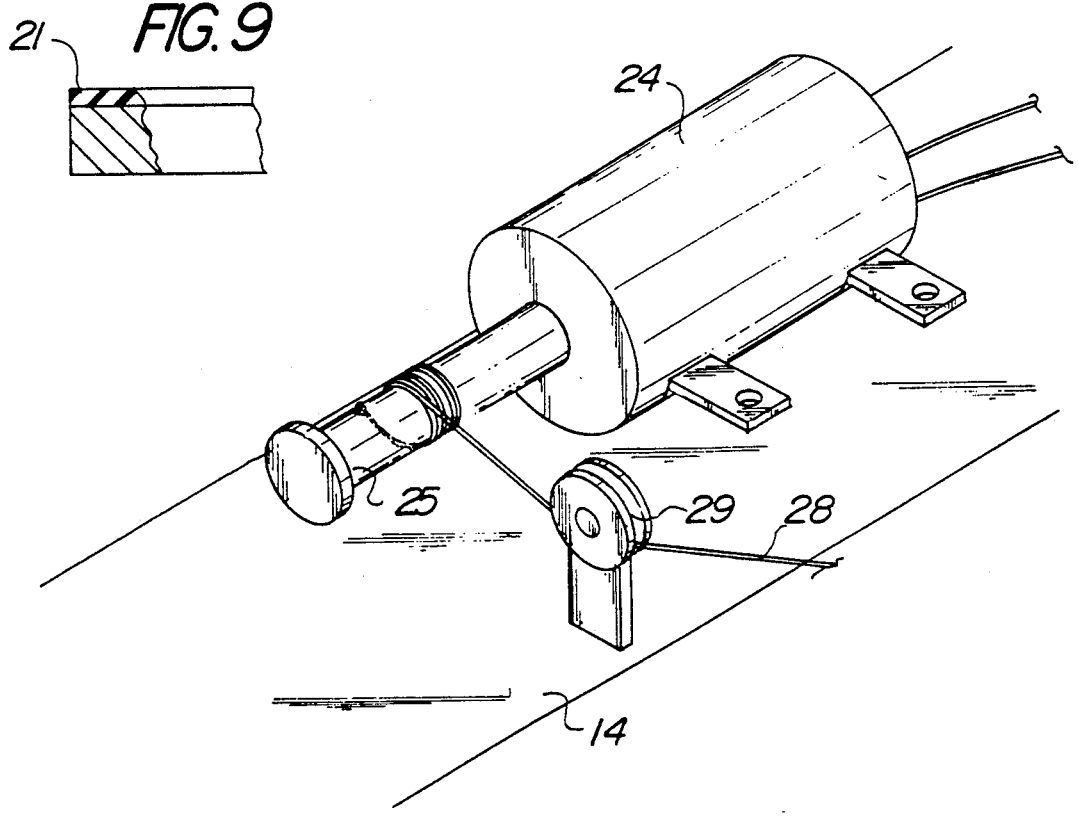

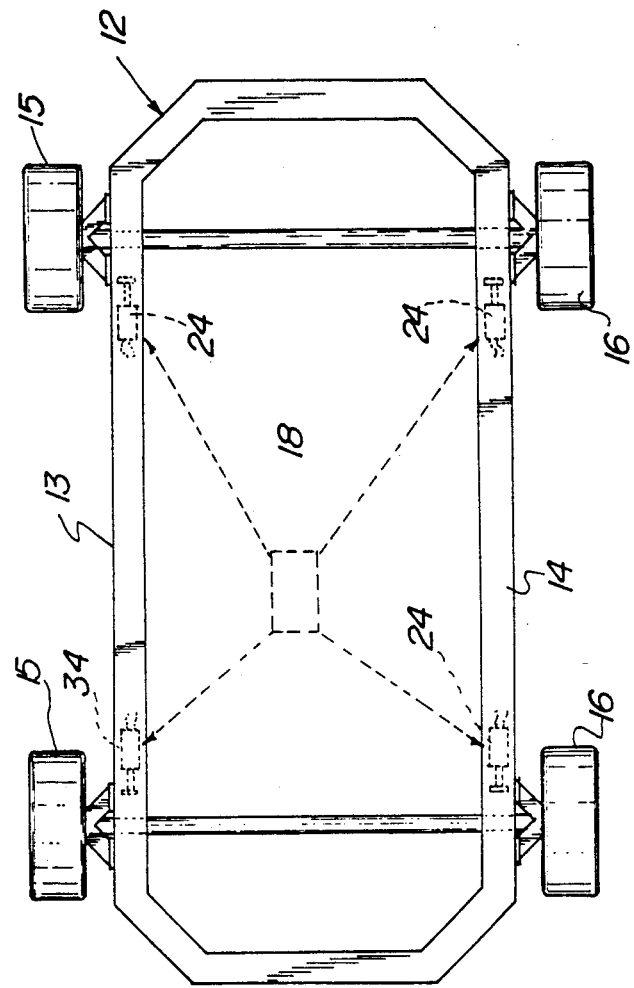
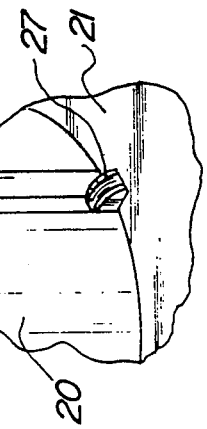
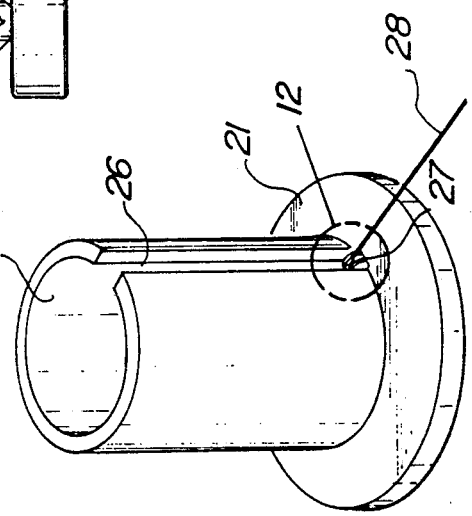

MODEL CAR SUSPENSION LIFT AND LOWERING APPARATUS

BACKGROUND OF THE INVENTION

1. Field of the Invention

The field of invention relates to model car suspension apparatus, and more particularly pertains to a new and improved model car suspension lift and lowering apparatus wherein the same is arranged to effect selective lifting and lowering of a model car chassis relative to an associated model car body.

2. Description of the Prior Art

Model cars and their suspension organizations have been employed to provide for various model car racing formats, such as indicated in U.S. Pat. Nos. 4,159,126 and 4,197,672. U.S. Pat. No. 4,865,378 to indicate a modular body structure for model car structure.

The instant invention attempts to overcome deficiencies of the prior art by providing for a manner of raising and lowering a model car chassis relative to an associated body structure and in this respect, the present invention substantially fulfills this need.

SUMMARY OF THE INVENTION

In view of the foregoing disadvantages inherent in the known types of model car apparatus now present in the prior art, the present invention provides a model car suspension lift and lowering apparatus wherein the same is arranged to permit selective lifting and lowering of each wheel relative to a model car body. As such, the general purpose of the present invention, which will be described subsequently in greater detail, is to provide a new and improved model car suspension lift and lowering apparatus which has all the advantages of the prior art model car apparatus and none of the disadvantages.

To attain this, the present invention provides a model car employing at each wheel a spring member mounted in surrounding relationship relative to a guide tube, with the guide tube mounted fixedly to a respective wheel axle at a lower end of the guide tube, with an upper end of the guide tube mounted to an upper control arm portion of the model car vehicle, wherein a drive motor includes a cable directed through the guide tube to effect adjustable displacement of the control arm relative to the axle at each wheel of the model car structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claim, nor is it intended to be limiting as to the scope of the invention in any way.

It is therefore an object of the present invention to provide a new and improved model car suspension lift and lowering apparatus which has all the advantages of the prior art model car apparatus and none of the disadvantages.

It is another object of the present invention to provide a new and improved model car suspension lift and lowering apparatus which may be easily and efficiently manufactured and marketed.

It is a further object of the present invention to provide a new and improved model car suspension lift and lowering apparatus which is of a durable and reliable construction.

An even further object of the present invention is to provide a new and improved model car suspension lift and lowering apparatus which is susceptible of a low cost of manufacture with regard to both materials and labor, and which accordingly is then susceptible of low prices of sale to the consuming public, thereby making such model car suspension lift and lowering apparatus economically available to the buying public.

Still yet another object of the present invention is to provide a new and improved model car suspension lift and lowering apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a model car organization as utilized by the invention.

FIG. 2 is an orthographic view of a model car wheel as typically utilized by the invention.

FIG. 3 is an isometric illustration of a conventional remote control transmitter, as employed by the invention.

FIG. 6 is an orthographic view, taken along the lines 6—6 of FIG. 5 in the direction indicated by the arrows.

FIG. 7 is an isometric enlarged illustration of section 7, as set forth in FIG. 4.

FIG. 8 is an orthographic view of the guide tube and spring structure arranged in a compressed configuration to effect lowering of the model car body relative to the model car chassis.

FIG. 9 is an orthographic view of section 9, as set forth in FIG. 6.

FIG. 10 is an orthographic top view of the model car chassis with a remote control receiver arranged for operative communication with reversible drive motor of the invention.

FIG. 11 is an enlarged isometric illustration of the guide tube and cable structure.

FIG. 12 is an enlarged isometric illustration of section 12, as set forth in FIG. 11.

DESCRIPTION OF THE PREFERRED EMBODIMENT

Figure 4:
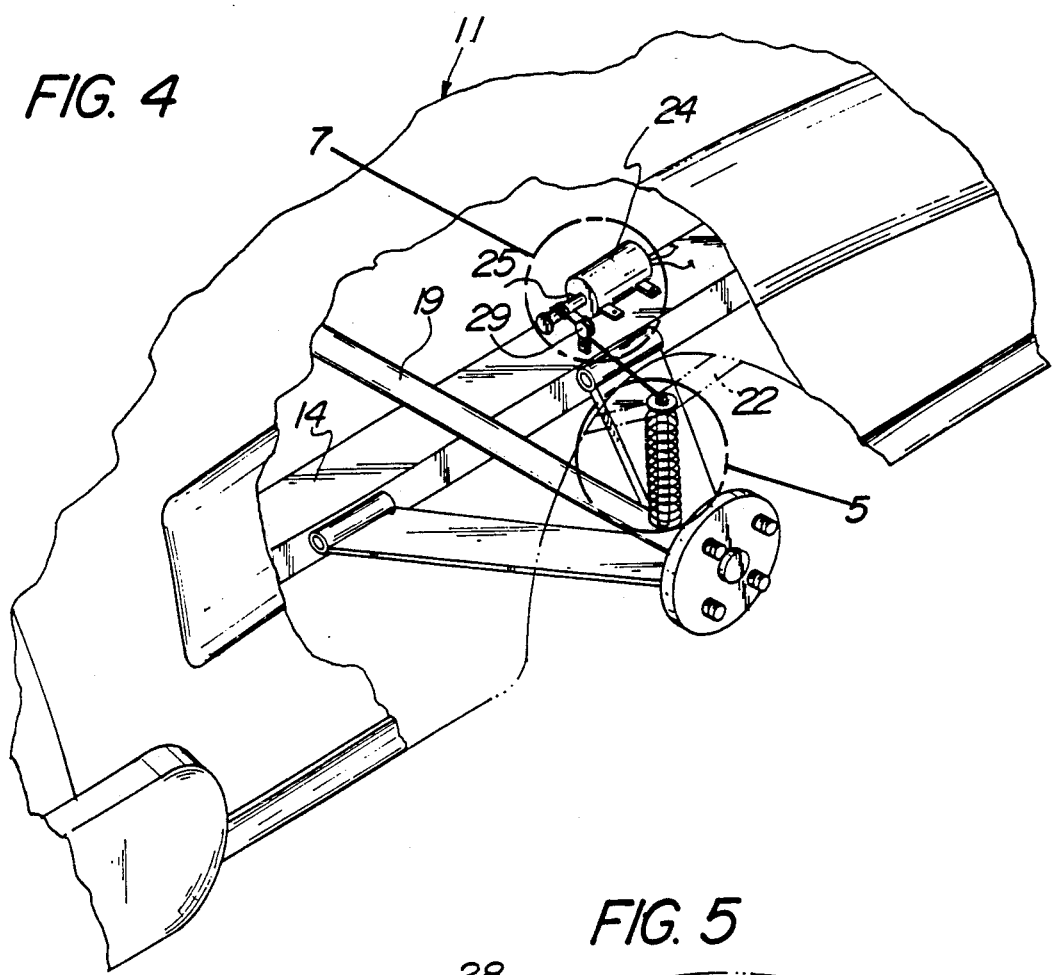
FIG. 4 is an isometric enlarged illustration of a model car wheel arranged for lifting and lowering relative to the associated body structure.

With reference now to the drawings, and in particular to FIGS. 1 to 12 thereof, a new and improved model car suspension lift and lowering apparatus embodying the principles and concepts of the present invention and generally designated by the reference numeral 10 will be described.

More specifically, the model car suspension lift and lowering apparatus 10 of the invention essentially comprises the use of a model car body 11, such as indicated in FIG. 1, mounted relative to a vehicle frame 12, of a type as indicated in FIG. 10 for example. The vehicle frame 12 includes a first side rail 13 spaced from a second side rail 14, with the first side rail having first side rail wheels 15 and the second side rail having second side rail wheels 16. The first and second side rail wheels 15 and 16 each include forward wheels and rear wheels arranged in coaxial alignment relative to one another, but may be arranged for independent pivoting relative to one another to permit steering, in a manner as exemplified in U.S. Pat. No. 4,197,672 incorporated herein by reference.

Figure 5:
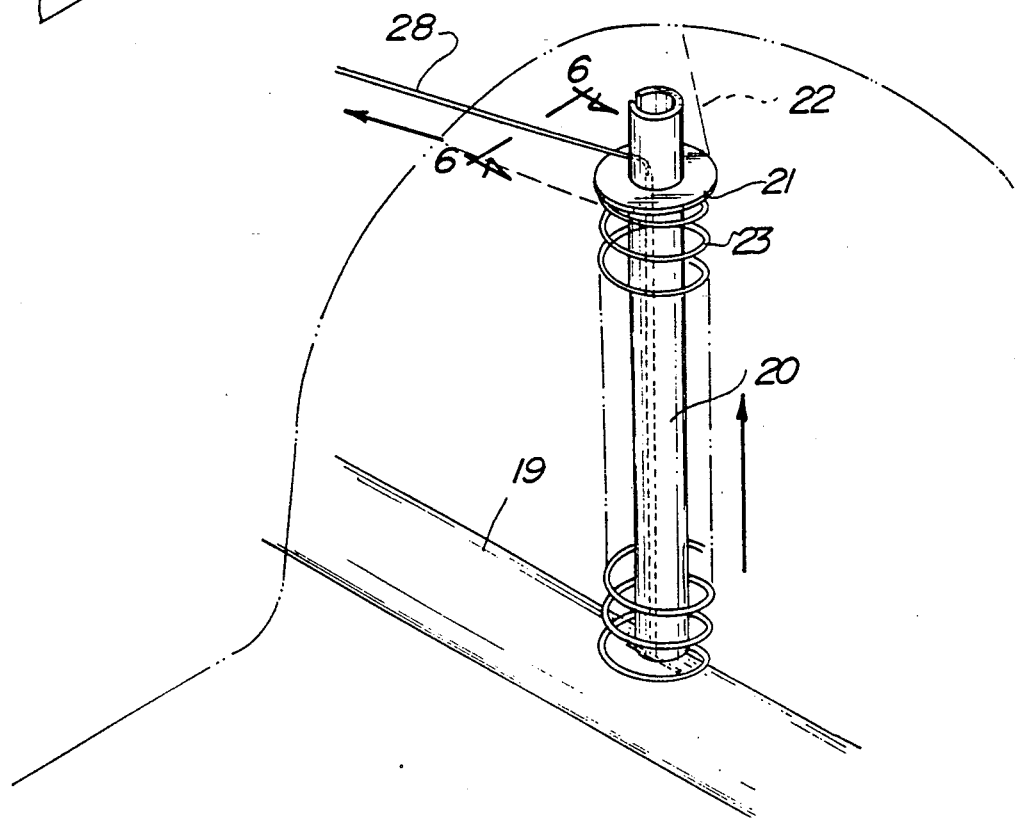
FIG. 5 is an enlarged isometric illustration of the guide tube and spring structure utilized by the invention.

The remote control transmitter 17 is provided, which may be configured of conventional construction, cooperative with a remote control receiver 18 mounted, in a manner as indicated in FIG. 10, within the body 11 and frame 12 in operative communication to effect actuation of each of the reversible winding and unwinding motors 24 associated with each of the wheels 15 and 16. Each wheel is mounted relative to a wheel axle 19 in a manner as indicated in FIG. 4 for example. A guide tube 20 is fixedly mounted onto the wheel axle 19 adjacent each respective wheel mounting flange, as indicated in FIG. 4. The guide tube 20 includes a guide collar 21 slidably mounted about the guide tube 20, with a guide tube coil spring 23 mounted between the collar 21 and the axle 19 about the guide tube 20. The collar 21 is arranged for reciprocation on the guide tube from a first extended position, as indicated in FIG. 6, to a second compressed configuration of the spring 23, as indicated in FIG. 8. An upper control arm 22 is mounted to the collar 21, as indicated in FIG. 5 for example. Each reversible motor 24 includes an output shaft 25, with a cable 28 arranged for winding about each shaft 25. The cable 28 is directed from the output shaft 25 along a guide pulley 29 fixedly mounted adjacent each motor to the frame 12 and directed through a guide tube slot 26 of each guide tube that extends through the guide tube, with a guide slot ramp 27 mounted onto each collar 21 at each intersection of each respective collar 21 at an intersection with each guide tube slot 26 to provide for a smooth projection of each cable into each guide tube 20, with each cable fixedly mounted at a lower distal end of each guide tube. In this manner, tensioning of the cable 28 effects compression of each respective coil spring 23, whereupon loosening of each cable or unwinding thereof each extension of each coil spring 23, in a manner as indicated in FIG. 6, to permit extension of the vehicle body 11 relative to the vehicle frame 12. It may be understood therefore that upon compression of each coil spring 23, the vehicle body 11 is arranged for receiving the vehicle frame for lowering of each vehicle body relative to the vehicle frame, whereupon reversal of the drive motor effects extension of the vehicle body relative to the vehicle frame to provide for a normal ride height.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A model car suspension lift and lowering apparatus, comprising,
   a vehicle frame, and
   a vehicle body mounted relative to the vehicle frame, with the vehicle frame having a first side rail spaced from a second side rail, with the first side rail having a first side rail forward wheel and first side rail rear wheel, the second side rail having a second side rail forward wheel and a second side rail rear wheel, and the first side rail forward wheel and the second side rail forward wheel are mounted in confronting relationship relative to one another, and the first side rail rear wheel and the second side rail rear wheel arranged in confronting relationship relative to one another, and
   the first side rail forward wheel and the second side rail forward wheel mounted to a first axle, and the first side rail rear wheel and the second side rail rear wheel mounted about a second axle, and
   control means arranged for directing the vehicle frame within the vehicle body, and a plurality of reversible drive motors mounted to the frame, with each of said reversible drive motors mounted in adjacency relative to one of said wheels, and a remote control transmitter arranged in operative communication with a remote control receiver, the remote control receiver mounted within the vehicle body, and the remote control receiver arranged for selective actuation of each reversible drive motor, and each axle having a guide tube mounted thereon in adjacency relative to a respective wheel, and each guide tube having a guide tube collar slidably receiving the guide tube therethrough, and a spring interposed between each collar and each axle in surrounding relationship relative to a respective guide tube, and each guide tube having a slot directed therethrough, with a cable directed through said slot over said collar and secured to a respective drive motor, with each drive motor having an output shaft receiving said cable thereabout, and each collar mounted to an upper control arm, each upper control arm mounted to said frame.

2. An apparatus as set forth in claim 1 including a guide slot ramp mounted to each collar at an intersection of each collar, with a respective guide tube slot.

* * * * *